United States Patent
Usami et al.

(10) Patent No.: US 7,665,103 B2
(45) Date of Patent: Feb. 16, 2010

(54) PHOTOSENSITIVE RECORDING MEDIUM, AND RECORDING AND REPRODUCING APPARATUS FOR SAME

(75) Inventors: Yoshihisa Usami, Shizuoka (JP); Nobuyuki Tada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 539 days.

(21) Appl. No.: 11/525,043

(22) Filed: Sep. 22, 2006

(65) Prior Publication Data
US 2007/0064578 A1    Mar. 22, 2007

(30) Foreign Application Priority Data
Sep. 22, 2005 (JP) ............... 2005-276437
Sep. 22, 2005 (JP) ............... 2005-276438

(51) Int. Cl.
*G11B 23/03*   (2006.01)
(52) U.S. Cl. .................................... 720/725
(58) Field of Classification Search ............ None
See application file for complete search history.

(56) References Cited

U.S. PATENT DOCUMENTS

| | | | |
|---|---|---|---|
| 7,292,147 B2 * | 11/2007 | Benedikt | 340/572.7 |
| 7,317,396 B2 * | 1/2008 | Ujino | 340/572.1 |
| 7,363,704 B2 * | 4/2008 | Kobayashi et al. | 29/832 |
| 7,378,971 B2 * | 5/2008 | Andrechak et al. | 340/572.7 |
| 7,492,691 B2 * | 2/2009 | Earhart | 369/103 |

FOREIGN PATENT DOCUMENTS

| | | |
|---|---|---|
| JP | 9-213053 A | 8/1997 |
| JP | 2001-210057 A | 8/2001 |

\* cited by examiner

*Primary Examiner*—Allen T Cao
(74) *Attorney, Agent, or Firm*—Sughrue Mion, PLLC

(57) ABSTRACT

A photosensitive recording medium comprising a substrate in a shape of disc having a center hole in a center part, and a holographic recording layer made from a photosensitive material, said photosensitive recording medium including a clamp area provided near an edge of said center hole and extending over 360 degree so as to surround said center hole, and a recording area provided at a distance from said clamp area and extending over 360 degree so as to surround said clamp area, wherein an RFID is embedded in a region between said clamp area and said recording area, or an RFID is embedded in an unrecordable region between said recording area and an outer circumferential edge of said recording medium.

14 Claims, 9 Drawing Sheets

FIG. 4B (1)
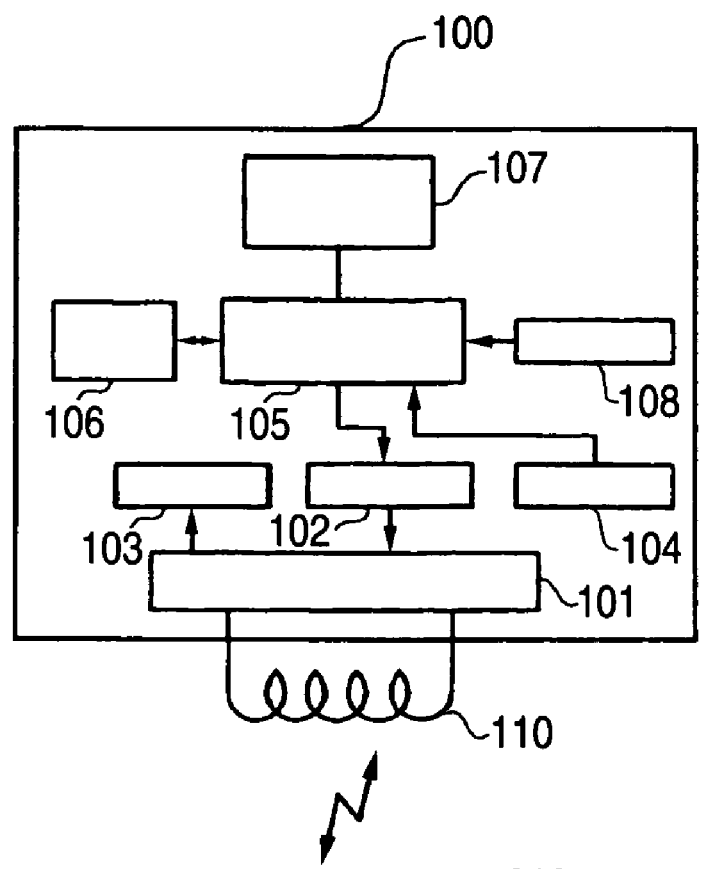
FIG. 4B (2)
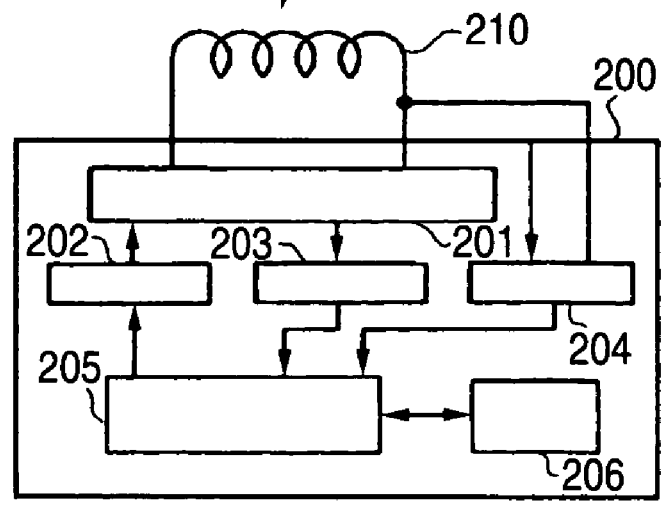

FIG. 5B (1)
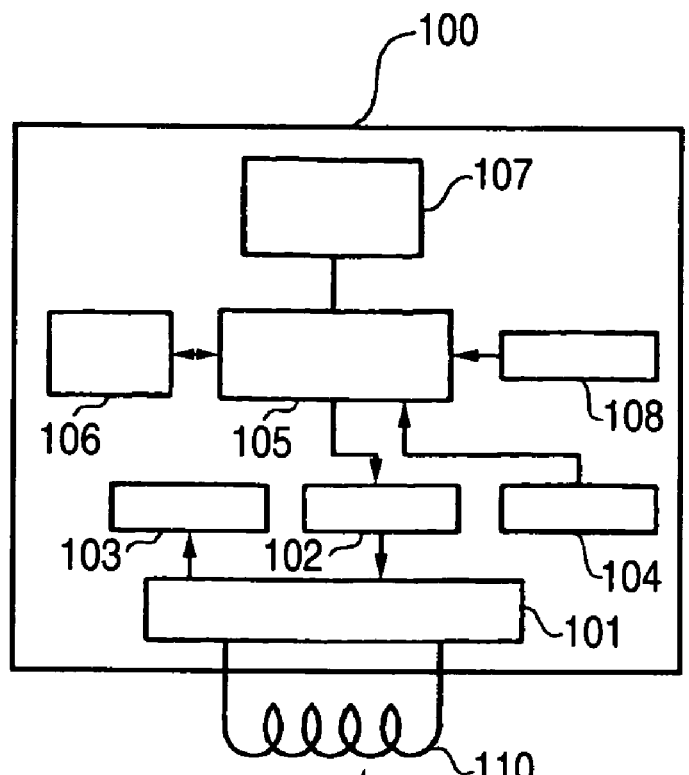
FIG. 5B (2)
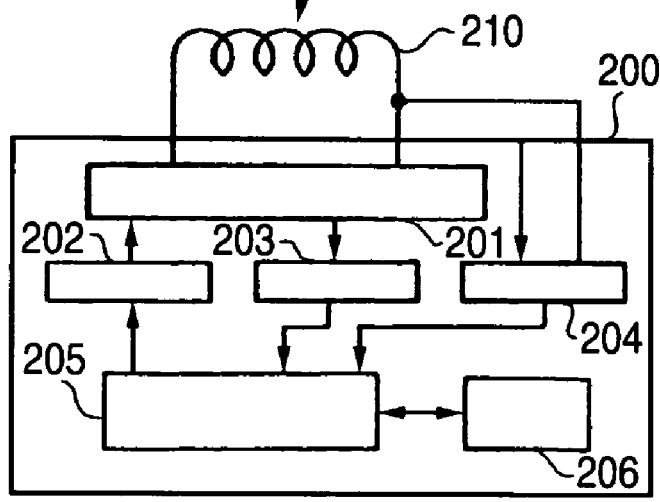

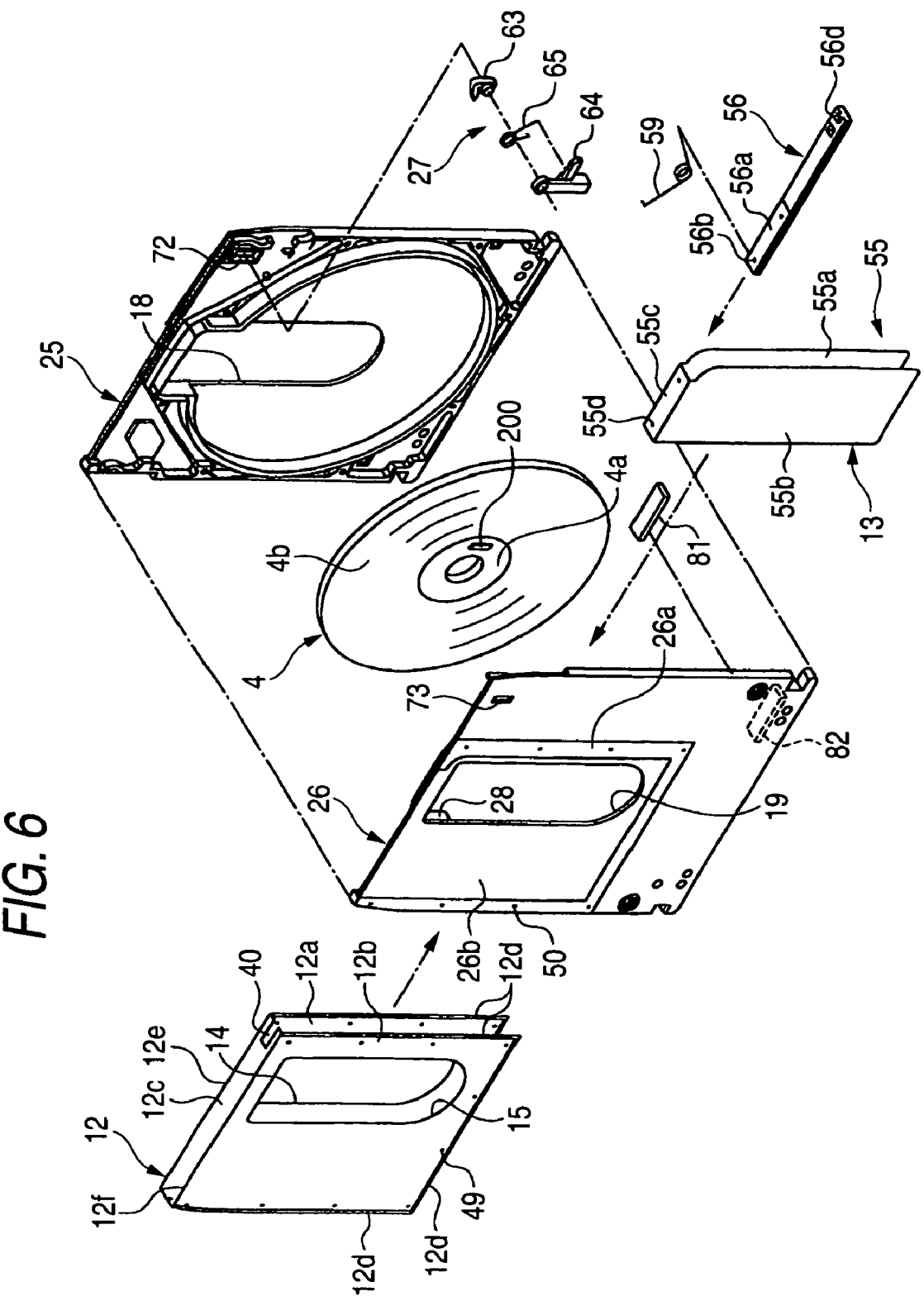

US 7,665,103 B2

PHOTOSENSITIVE RECORDING MEDIUM, AND RECORDING AND REPRODUCING APPARATUS FOR SAME

FIELD OF THE INVENTION

The present invention relates to a holographic recording medium on which data are recorded holographically, and more particularly, to a photosensitive recording medium and a recording and reproducing apparatus for the same.

BACKGROUND OF THE INVENTION

A holographic recording medium on which data are recorded holographically has been already invented.

This holographic recording medium is a photosensitive recording medium which has holographic recording layers each made of photosensitive material provided on a substrate in a shape of a disc. Data are multilayeredly recorded on the holographic recording medium as interference fringes of laser light, so that the holographic recording medium can obtain a larger data recording capacity than that of a DVD which is a recording medium heretofore widespread. Exposure of the holographic recording layers to light or deposition of dust on the holographic recording layers exerts a bad influence on the performance of the holographic recording medium. For this reason, the holographic recording medium has been dealt with in the condition that the holographic recording medium is stored in a cartridge having a light-shielding function and dustproof function, and the cartridge of this type provided with a cartridge body, a shutter member, and a shutter cover has been known.

As for the cartridge for containing the holographic recording medium, in order to prevent so-called scoodling, a system capable of discriminating recorded software from a falsely copied imitation, that is, the system for discriminating this cartridge from copied products has been disclosed (JP-A-09-213053).

Meanwhile, in case of a DVD disk which is not a disk of photosensitive recording medium, there has been known an invention for effectively preventing an optical disk from being carried out without permission, by forming a reflecting film which stores information as pits, on a surface around a central hole of a disk substrate with a determined space to a hole edge of the central hole, and providing an RFID which resonates with electronic waves of specific frequency transmitted from an antenna, inside the disk substrate between the hole edge of the central hole and an inner edge of the reflecting film (JP-A-2001-210057).

SUMMARY OF THE INVENTION

Although the magnetic disk cartridge described in JP-A-09-213053 is so constructed as to detect the discriminating member by an optical sensor, it is difficult to apply the structure for detecting the discriminating member by the optical sensor to the holographic recording medium, because when recording, the data are irradiated to the holographic recording layer formed of photosensitive material as interference fringes of laser light, and shielded environment will be created by a recording part of a drive.

The invention in JP-A-2001-210057 discloses that the RFID is provided inside the disk, although it is not a photosensitive disk. However, disk imbalance which will occur due to provision of the RFID in the disk is not at all taken into consideration. The applicant of this invention has paid attention to a fact that the disk imbalance which has been disregarded in other disks will be a problem in future.

The invention has been made in view of the above described circumstance, and it is an object of the invention to provide a photosensitive recording medium, and a recording and reproducing apparatus using the same in which information of the photosensitive recording medium itself can be easily obtained, the photosensitive recording medium can be discriminated from other photosensitive recording mediums, and at the same time, disk imbalance will not occur during rotation of the photosensitive recording medium.

In addition, the invention has been made in view of the above described circumstance, and it is an object of the invention to provide a photosensitive recording medium, and a recording and reproducing apparatus using the same in which information of the photosensitive recording medium itself can be easily obtained, the photosensitive recording medium can be discriminated from other photosensitive recording mediums, and at the same time, mounting position of a reading device for an RFID in the recording and reproducing apparatus can be more freely selected, by avoiding interference with a spindle motor, on whichever side of the disk the reading device may be mounted.

In order to achieve the above describe object, there is provided, according to the invention, a photosensitive recording medium comprising a substrate in a shape of disc having a center hole in a center part, and a holographic recording layer of photosensitive material provided on the substrate, the photosensitive recording medium including a clamp area provided near an edge of the center hole and extending over 360 degree so as to surround the center hole, a recording area provided at a determined distance from the clamp area and extending over 360 degree so as to surround the clamp area, characterized in that an RFID (Radio Frequency Identification) is embedded in a region between the clamp area and the recording area (a first embodiment of the invention).

Alternatively, the photosensitive recording medium is characterized in that an RFID (Radio Frequency Identification) is embedded in an unrecordable region between the recording area and an outer circumferential edge of the recording medium (a second embodiment of the invention).

In the photosensitive recording medium according to the above described first or second embodiment, it would be preferable that a recess is formed in the region, and the RFID (Radio Frequency Identification) is embedded in the recess. In this case, it would be preferable that at least a part of a space which remains around the embedded RFID is sealed with resin.

It would be preferable that the resin for sealing has a smaller specific gravity than the material of the photosensitive recording medium. Further, it would be preferable that a weight of the photosensitive recording medium which has been removed for forming the recess is substantially equal to a sum of a weight of the RFID and a weight of the resin which seals the recess.

It would be preferable that a weight for adjusting disk imbalance is provided at an opposite side to the recess with respect to the center hole.

A third embodiment of the invention relates to a cartridge for a photosensitive recording medium capable of rotatably containing a disc-shaped recording medium and comprising a cartridge body having an opening for exposing the center and a recording face of the disc-shaped recording medium to the exterior, and a shutter assembled to an outside of the cartridge body and adapted to move between a closed position in which the opening is closed and an open position in which the opening is opened, characterized in that the photosensitive recording medium according to the above descried first or second embodiment is contained in the cartridge.

It would be preferable that in the cartridge for the photosensitive recording medium as described above, another RFID is provided inside the cartridge body.

A fourth embodiment of the invention relates to a recording and reproducing apparatus for a photosensitive recording medium which contains the cartridge for photosensitive recording medium as described above, and conducts recording and reproducing on recording layer of the recording medium while rotating the recording medium by opening the shutter, characterized in that a reading device for the RFID is mounted on an opposite side to a side where a spindle motor for rotating the recording medium exists.

A fifth embodiment of the invention relates to a recording and reproducing apparatus for a photosensitive recording medium which contains the cartridge for the photosensitive recording medium as described above, and conducts recording and reproducing on recording layer of the recording medium while rotating the recording medium by opening the shutter, characterized in that a reading device for the RFID is mounted close to the RFID.

By constructing in this manner, according to the first embodiment, the RFID is embedded at a position of a determined distance in the region between the clamp area and the recording area. Therefore, it is possible to easily obtain the information of the photosensitive recording medium itself, and to discriminate the photosensitive recording medium from other photosensitive recording mediums. At the same time, disk imbalance when the disk is rotated will be decreased, as compared with a case where the RFID is provided at an outer circumference of the disk.

By constructing in this manner, according to the second embodiment, the RFID is embedded in the unrecordable region between the recording area and the outer circumferential edge of the recording medium. Therefore, it is possible to easily obtain the information of the photosensitive recording medium itself, and to discriminate the photosensitive recording medium from other photosensitive recording mediums. At the same time, mounting position of the reading device for the RFID in the recording and reproducing apparatus can be more freely selected, by avoiding interference with the spindle motor, on whichever side of the disk the reading device may be mounted.

In addition, because the RFID is embedded in the recess, the RFID will not protrude from a surface of the disk, and a distance with respect to the disk cartridge can be reduced, whereby a thin disk cartridge can be produced. It is of course possible to adjust the disk imbalance when the disk is rotated, by varying a capacity of the recess.

Moreover, because at least a part of the space which remains around the embedded RFID is sealed with resin, the RFID will be prevented from being soiled, fallen, and damped.

Further, by using the resin for sealing having a smaller specific gravity than the material of the photosensitive recording medium, it is possible to make the weight of the RFID equal to a difference between the weight of the material for the photosensitive recording medium and the weight of the resin. Therefore, the problem of the disk imbalance can be solved.

Still further, because the weight of the photosensitive recording medium which has been removed for forming the recess is made substantially equal to the sum of the weight of the RFID and the weight of the resin which seals the recess, there will be created the same situation as in the case where the RFID is not provided. Therefore, the problem of the disk imbalance can be solved.

Still further, because the weight for adjusting the disk imbalance is provided at the opposite side to the recess with respect to the center hole, the problem of the disk imbalance can be easily solved.

Moreover, according to the third embodiment, because the photosensitive recording medium according to the above descried first or second embodiment is contained in the cartridge for the photosensitive recording medium, the photosensitive recording medium can be completely shielded from light. At the same time, it is possible to easily obtain the information of the photosensitive recording medium itself, and to discriminate it from other photosensitive recording mediums.

Because another RFID is provided inside the cartridge body, the photosensitive recording medium can be completely shielded from light. At the same time, it is possible to easily obtain the information of the photosensitive recording medium itself and the cartridge itself, and to discriminate the cartridge from other products, which will serve as a security measure.

According to the fourth and fifth embodiments, the reading device for the RFID is mounted on the opposite side to the side where the spindle motor for rotating the recording medium exists. Therefore, the motor and so on will not hinder recording and reproduction in case of a one-faced disk.

BRIEF DESCRIPTION OF THE DRAWINGS

FIG. 4B is respective block diagrams of them.

FIG. 5B is respective block diagrams of them.

FIG. 6 is an exploded perspective view showing structure of a cartridge having light-shielding performance which contains therein the photosensitive recording medium according to the first embodiment of the invention.

DETAILED DESCRIPTION OF THE INVENTION

Figure 1:
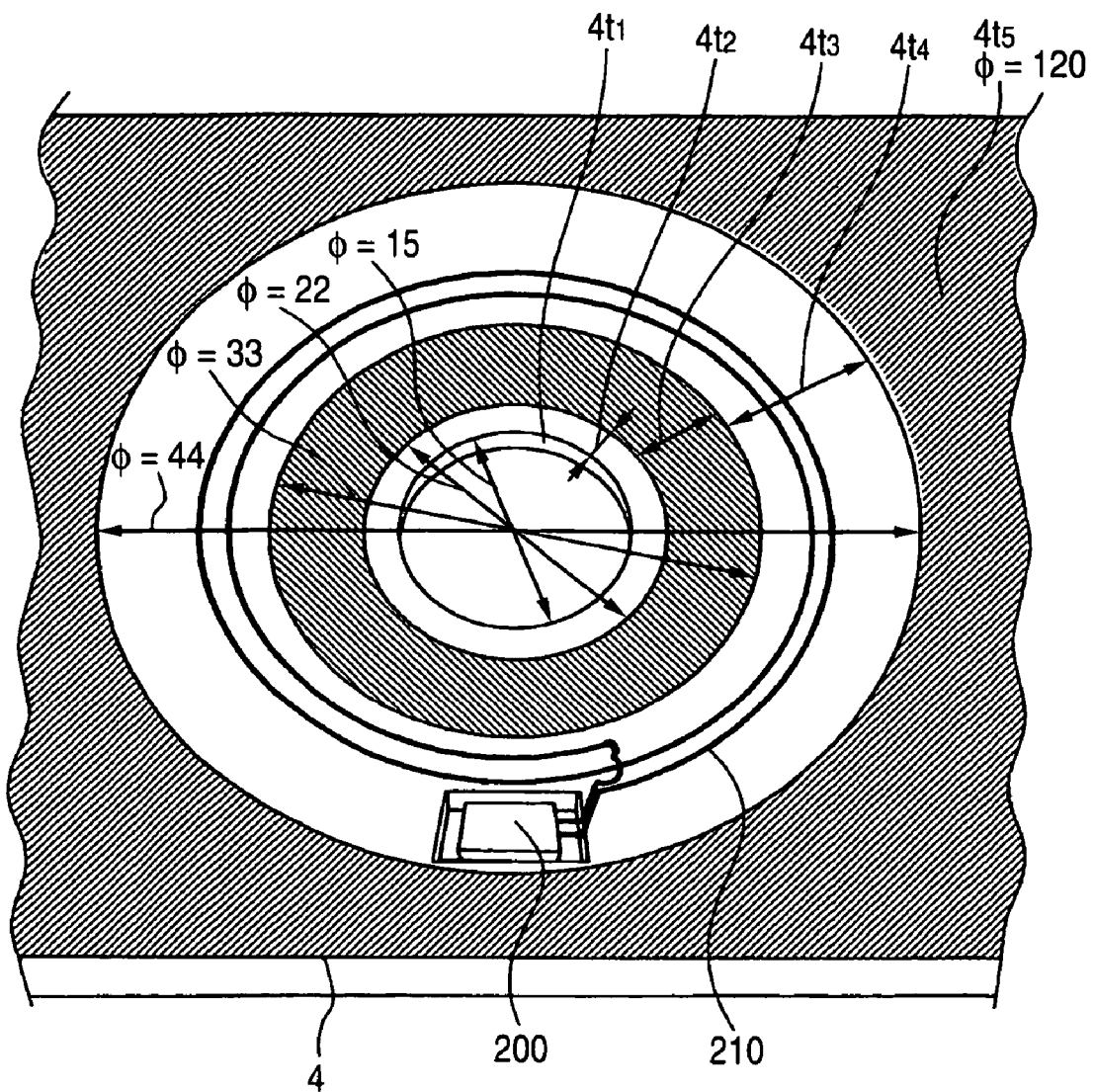
FIG. 1 is a perspective view showing a configuration around a center hole of a photosensitive recording medium in a first embodiment according to the invention.

Now, embodiments of the invention will be described in detail referring to the drawings.

FIG. 1 is a perspective view showing an area around a center hole of a photosensitive recording medium in a first embodiment according to the invention.

In FIG. 1, denoted by numeral 4 is a photosensitive recording medium, $4t_1$ is a center hole ($\phi$=15 mm) of the photosensitive recording medium 4. $4t_3$ is a clamp area ($\phi$22 to 33 mm).

$4t_5$ is a recording area (φ=44 to 120 mm) Accordingly, an area $4t_4$ having a width of 11 mm is formed between the clamp area $4t_3$ and the recording area $4t_5$ at 360 degree around the center hole.

In the first embodiment of the invention, it is possible to discriminate the photosensitive recording medium from other photosensitive recording mediums by mounting an RFID which will record information of the photosensitive recording medium itself. For this purpose, an RFID 200 is attached to the area $4t_4$. In this case, the RFID 200 is not provided in the area $4t_4$ so as to be exposed, but embedded in a recess $4h$ which is formed in the area $4t_4$.

Additionally, a coil 210 having one or more windings which functions as an antenna is provided in the area $4t_4$ between the clamp area $4t_3$ and the recording area $4t_5$, and both ends of the coil 210 are connected to the RFID 200.

Figure 2:
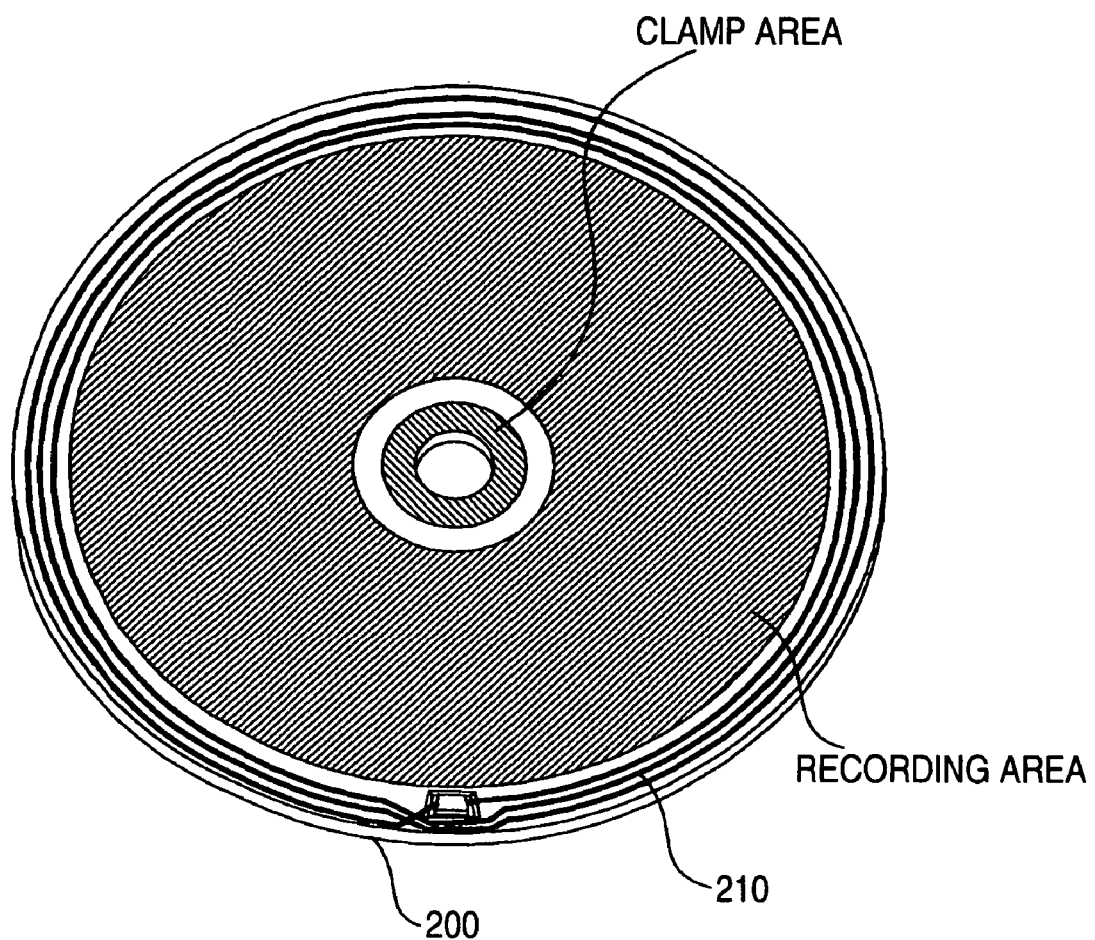
FIG. 2 is a perspective view showing a configuration around a center hole of a photosensitive recording medium in a second embodiment according to the invention.

FIG. 2 is a perspective view showing the photosensitive recording medium in a second embodiment according to the invention.

By constructing the photosensitive recording medium as shown in FIG. 1 or in FIG. 2, the RFID 200 and the coil 210 are provided in the area which has not been used heretofore. Therefore, there is no necessity of adding any modification to a conventional layout of the disk. Moreover, because the RFID is embedded in the recess, a distance to a cartridge will not change, and a thin disk cartridge can be used as in the conventional case. Further, in case of exposed mounting, the problem of disk imbalance may occur because weight will be increased by the RFID' own weight at a position where the RFID 200 is mounted. However, such anxiety of balance will be reduced, by forming the recess at the same position and removing substrate material at the position.

FIG. 3A to 3D is sectional views for describing a method of compensating for the RFID own weight.

Figure 3A:
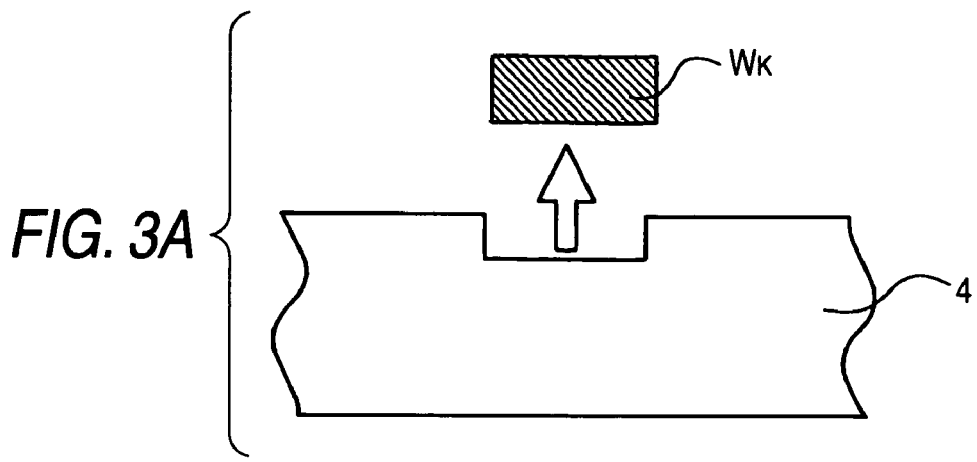
FIG. 3A to 3D is sectional views for describing a method of compensating for an RFID's own weight.

FIG. 3A shows an aspect in which a part of the photosensitive recording medium 4 has been removed for the purpose of forming the recess. The photosensitive recording medium has become lightweight by a weight WK of the material for the recording medium which has been removed corresponding to the recess, and imbalance in weight has occurred with respect to a diametrically opposite position of the disk.

Figure 3B:
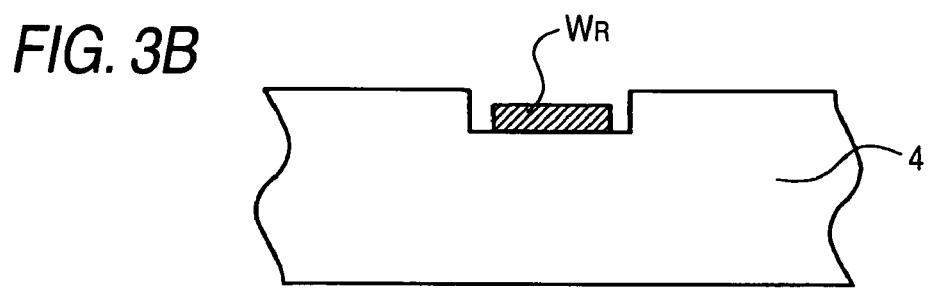

FIG. 3B shows an aspect in which the RFID has been attached to the recess formed in the photosensitive recording medium 4. In this case, since the RFID has been attached, the recess has become heavier by a weight WR of the RFID than in the case of FIG. 3A.

Therefore, by making the weight WK of the recording medium at the position of the recess equal to the weight WR of the RFID, it is possible to restore the state where no imbalance exists before the RFID has been attached.

Figure 3C:
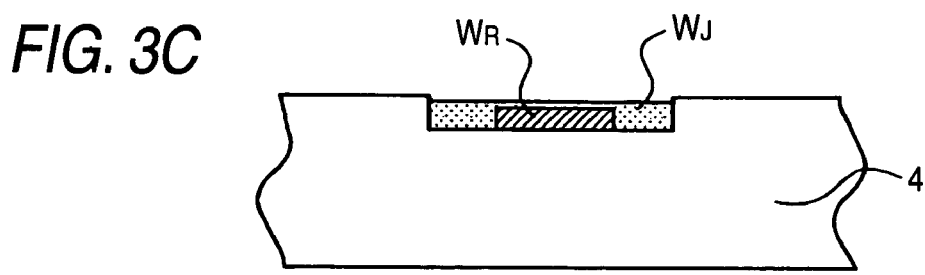

FIG. 3C shows an aspect in which at least a part of the recess to which the RFID has been attached is sealed with resin. In this manner, the RFID will be prevented from being soiled, fallen and damped.

In order to adjust the imbalance in this case, the weight of the material for the recording medium corresponding to a weight WJ of the resin may be increased in the recess more than in the recess in the case of FIG. 3B.

Figure 3D:
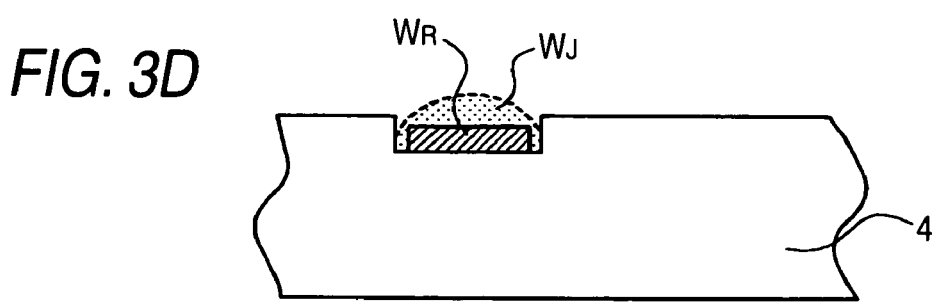

On the other hand, in FIG. 3D, such measure as in FIG. 3C is not taken. Because a sufficient space is not formed in the recess, a surface of the resin will protrude from the surface of the recording medium, which is unfavorable.

Although the problem of the disk imbalance can be solved by the above described means, it is also possible to easily solve the problem of the disk imbalance, by embedding a weight for adjusting the disk imbalance at an opposite side to the recess with respect to the center hole.

Then, structure and function of the photosensitive recording medium having the RFID embedded according to the invention will be described.

Figure 4A:
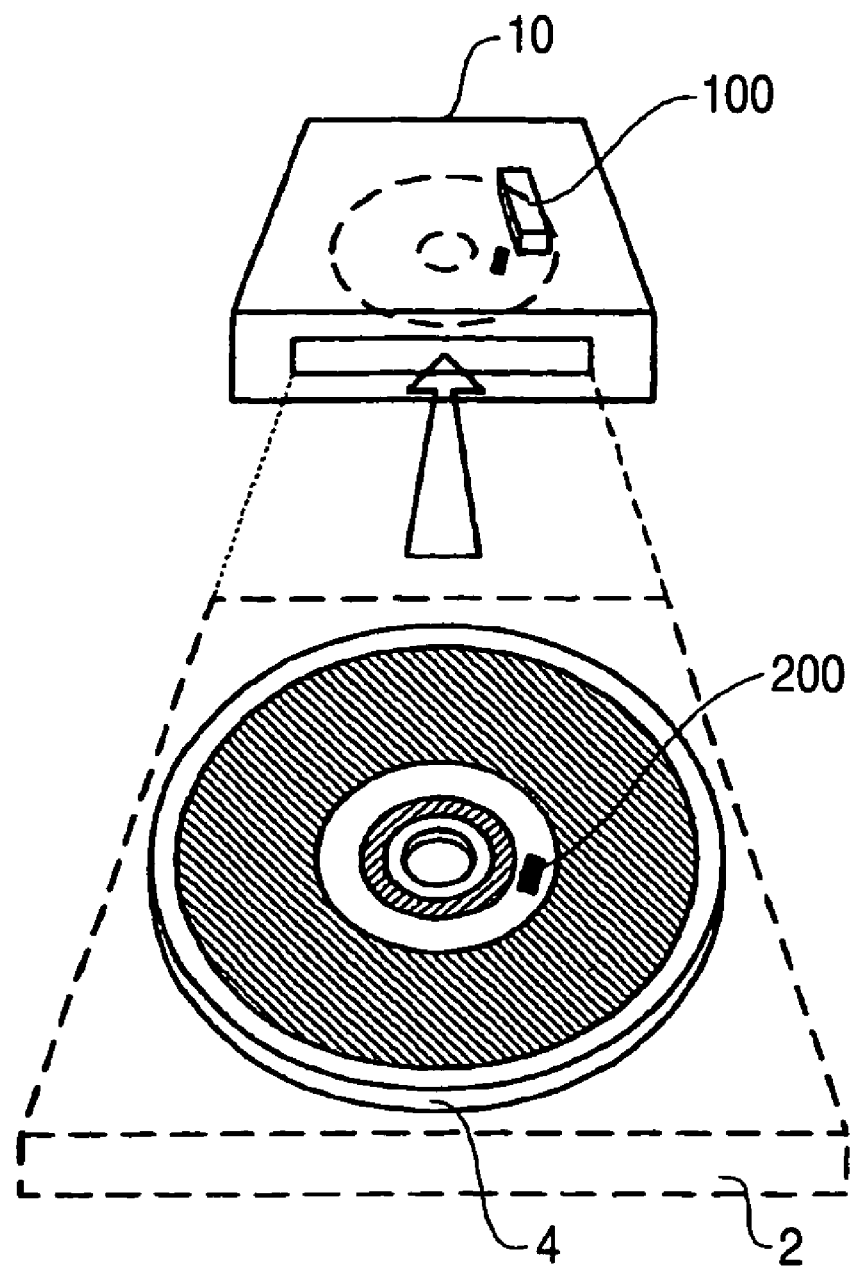
FIG. 4A is a schematic perspective view of the photosensitive recording medium having the RFID, and the recording and reproducing apparatus using the same in the first embodiment.

FIG. 4A is a schematic perspective view of the photosensitive recording medium having the RFID, and the recording and reproducing apparatus for the same in the above described first embodiment, and FIG. 4B is respective block diagrams of them.

Figure 5A:
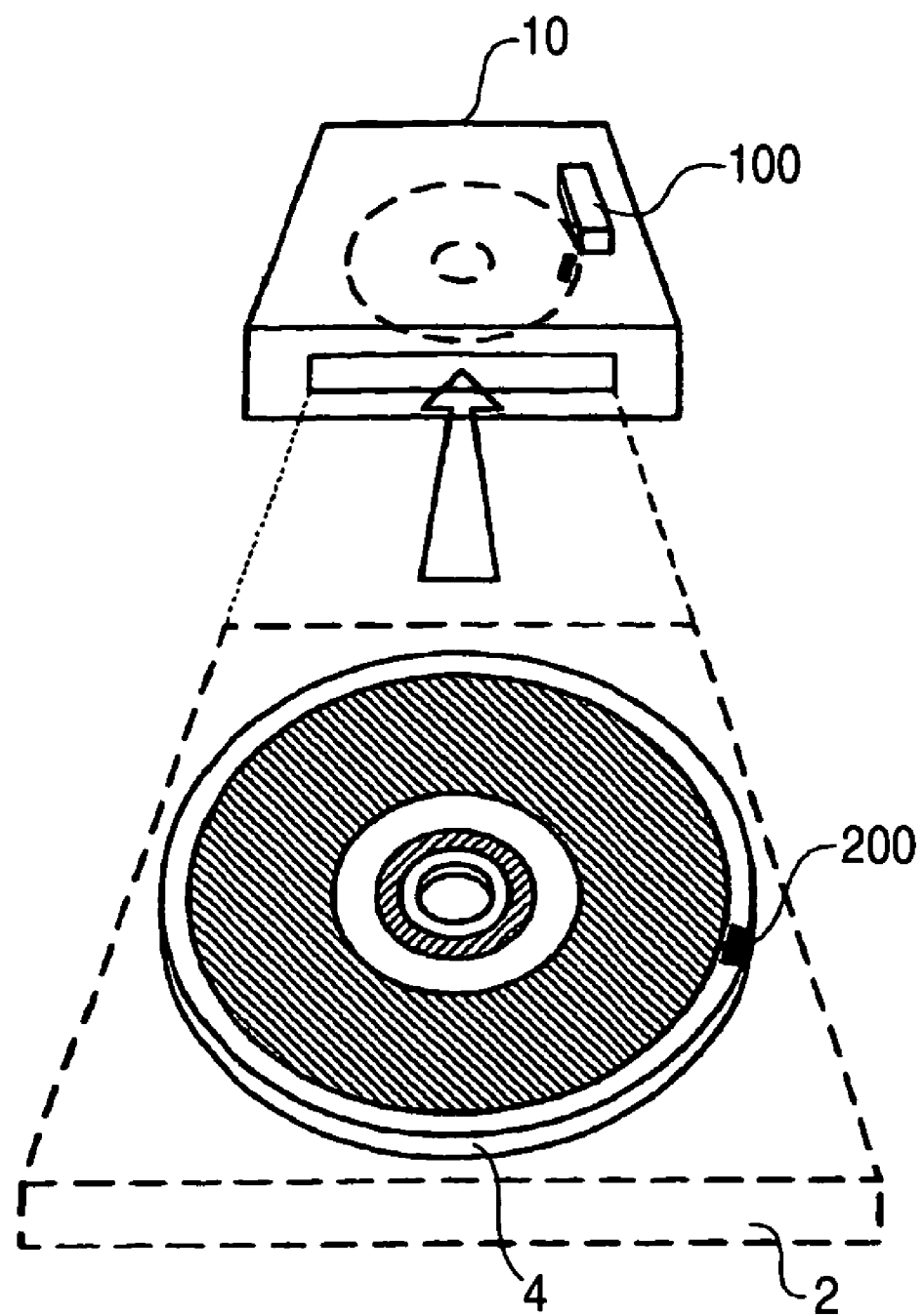
FIG. 5A is a schematic perspective view of the photosensitive recording medium having the RFID, and the recording and reproducing apparatus using the same in the second embodiment.

FIG. 5A is a schematic perspective view of the photosensitive recording medium having the RFID, and the recording and reproducing apparatus using the same in the above described second embodiment, and FIG. 5B is respective block diagrams of them.

As shown in FIGS. 4 and 5, the RFID 200 includes an RF (Radio Frequency) circuit 201, a modulation circuit 202, a demodulation circuit 203, a power supply circuit 204, a CPU 205, and a memory 206 which is connected to the CPU and stores information intrinsic to an optical disk 4.

The power supply circuit 204 incorporates a condenser (not shown), which cooperates with the coil 210 to form a resonant circuit. The condenser will be charged with electric power which is generated by electromagnetic induction when the coil 210 has received a radio wave having a specific resonant frequency.

The power supply circuit 204 will rectify and stabilize this electric power, and supply it to the CPU 205 thereby to activate the RFID 200. The memory 206 includes a ROM, a RAN, and an EEPROM, and will read the stored data according to a reading command by data communication of the radio waves under control of the CPU 205, and will write the data according to a writing command from the recording and reproducing apparatus.

As shown in FIGS. 4 and 5, an antenna 110 is connected to the recording and reproducing apparatus 100 which will read the data from the RFID 200. The recording and reproducing apparatus 100 includes a power supply circuit 104 which incorporate a battery, an RF (Radio Frequency) circuit 101, a modulation circuit 102, a demodulation circuit 103, a CPU 105, a memory 106, a display 107, and an input device 108.

The recording and reproducing apparatus 100 will transmit radio waves having a specific frequency to the coil 210 of the optical disk 4 by way of the antenna 110 thereby to activate the RFID 200, and reproduce the data in the memory 206 of the RFID 200. The reproduced data will be received from the coil 210 by way of the antenna 110. The recording and reproducing apparatus 100 will discriminate the optical disk 4 and read the information of the optical disk 4 from the memory 106 to display it on the display 107.

While seeing contents displayed on the display 107, an operator can record necessary additional information in the memory 106 using the input device, and also in the memory 206 of the RFID 200. The necessary information includes, for example, a title, a type, contents, and a recording time of the recorded data, a position where optical recording has started, which are the information intrinsic to the optical disk 4.

The recording and reproducing apparatus for the photosensitive recording medium includes, as described above, the RF (Radio Frequency) circuit 101, the modulation circuit 102, the demodulation circuit 103, the power supply circuit 104 and the antenna 110 so as to deal with the photosensitive recording medium. The recording and reproducing apparatus is further provided with a spindle motor which will rotate the photosensitive recording medium. Because the RFID is provided near the clamp area in the first embodiment, reading is difficult in case where a reading device for the RFID in the photosensitive recording medium of one-faced type is mounted on a side of the spindle motor. Therefore, the reading device had better be mounted at an opposite side of the photosensitive recording medium to the side where the spindle motor is provided. In this manner, the spindle motor will not hinder recording and reproduction.

In the second embodiment of the invention, because the RFID is attached near an outer edge of the disk, the reading device for the RFID may be mounted on either side of a front and a back faces of the disk, and thus, flexibility of mounting will be enhanced.

There are various types of the RFID tags, such as a label type, a card type, a coin type, a stick type and so on. Their communication distance varies from a few millimeter to a few meter. The RFID tag may be appropriately selected according to use, size of the disk, and structure of the recording and reproducing apparatus.

Further, by containing the photosensitive recording medium as described above in a cartridge having light-shielding performance as shown below, the photosensitive recording medium can be completely shielded from light, and at the same time, the information of the photosensitive recording medium itself can be easily obtained by the RFID.

FIG. 6 is an exploded perspective view showing structure of a cartridge having light-shielding performance which contains therein the photosensitive recording medium according to the first embodiment of the invention.

Figure 7:
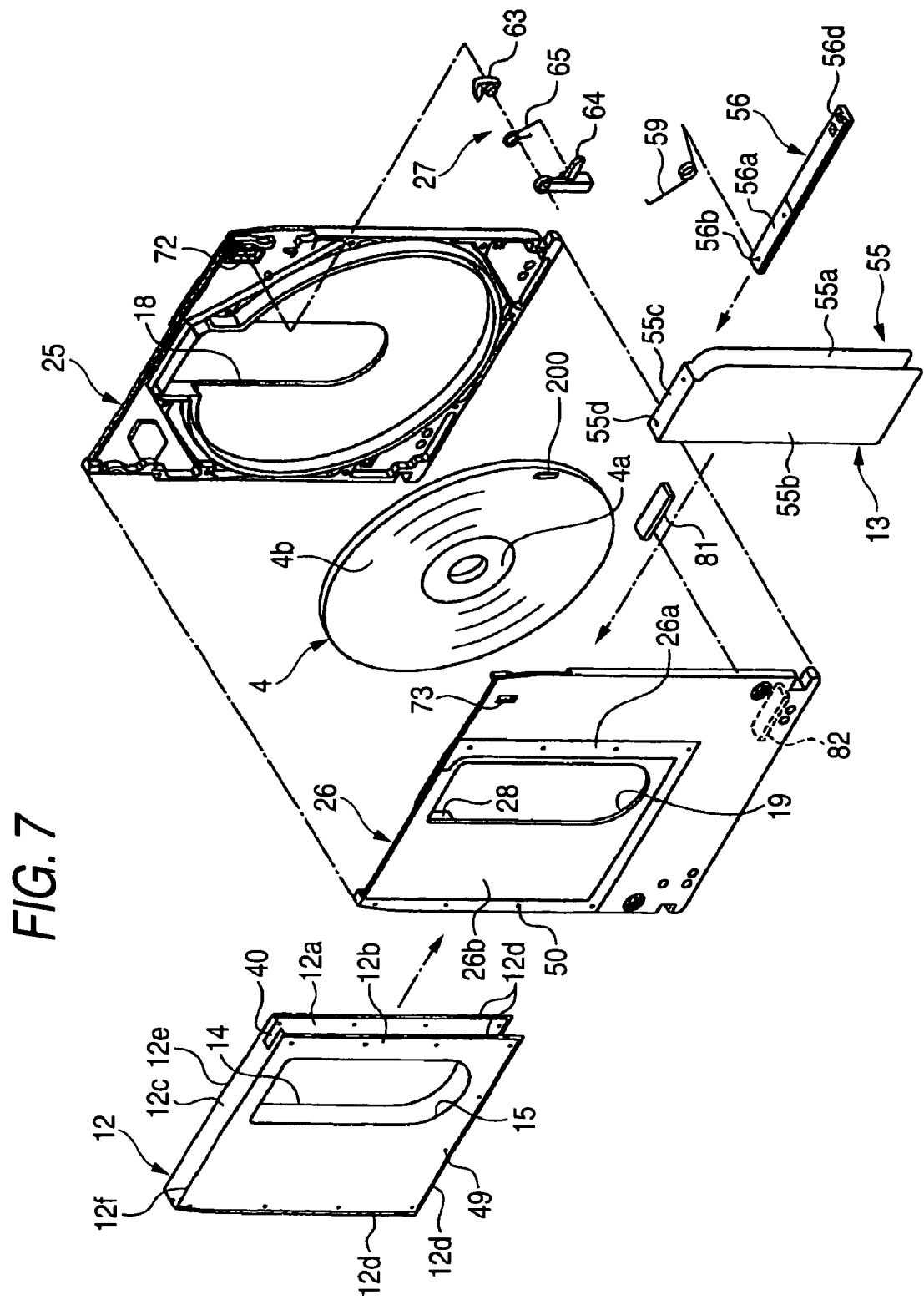
FIG. 7 is an exploded perspective view showing structure of a cartridge having light-shielding performance which contains therein the photosensitive recording medium according to the second embodiment of the invention.

FIG. 7 is an exploded perspective view showing structure of a cartridge having light-shielding performance which contains therein the photosensitive recording medium according to the second embodiment of the invention.

As shown in FIGS. 6 and 7, a cartridge body includes a first shell 25 substantially in a shape of a plate, a second shell 26 connected to the first shell 25, and a lock mechanism 27 which is incorporated between the first shell 25 and the second shell 26 for locking a shutter 13.

The first shell 25 and the second shell 26 are respectively provided with internal openings 18, 19 through which the central part 4a and the recording face 4b of the recording disk 4 are exposed to the exterior.

After the photosensitive recording medium 4 has been placed on the second shell 26, the first shell 25 is superposed on an upper face of the second shell 26. By rigidly joining the first shell 25 to the second shell 26 by ultrasonic welding, there will be formed no gap in a mating portion between the first and second shells.

On the outer faces of the first shell 25 and the second shell 26, there are formed light-shield plate attaching surfaces 25a, 26b each offset inward so as to be formed into a size slightly larger than a light-shield plate 12 with stepped portions each having a depth larger than a thickness of the light-shield plate 12.

The light-shield plate 12 is formed by making outer openings 14, 15 and a notch 40 for obtaining a moving range of the shutter 13, in a thin plate of aluminum alloy and by bending the thin plate substantially into a U-shape in section. In this manner, the light-shield plate 12 is provided with a first plate portion 12a having the outer opening 14, a second plate portion 12b having the outer opening 15, and a third plate portion 12c having the notch 40 and connecting the first plate portion 12a to the second plate portion 12b.

Slits are formed in ridgeline parts of the third plate portion 12c with respect to the first plate portion 12a and the second plate portion 12b, and intersection parts with respect to two edges at both sides of an inserting direction of the cartridge 2 and with respect to one edge intersecting the inserting direction, so that outer edges of the first and second plate portions 12a, 12b are flexed into a substantially C-shape in a direction where they are brought close to each other (In other words, in a direction to approach the cartridge body when the light-shield plate is attached to the cartridge body). In this manner, bent portions 12d substantially in a C-shape are formed at the outer edges of the first plate portion 12a and the second plate portion 12b.

The light-shield plate 12 is attached to the light-shield plate attaching surfaces 25a, 26a of the cartridge body in such a manner that surfaces of the cartridge body are held by the first and second plate portions 12a and 12b, and the front end of the cartridge body in the inserting direction is covered with the third plate portion 12c. The light-shield plate attaching surfaces 25a and 26a are offset inward to have a depth not smaller than the thickness of the light-shield plate 12 so that the outer faces of the light-shield plate 12 attached to the cartridge body will not protrude from the surface of the cartridge 2.

Small holes 49 are formed at intervals of an approximately equal pitch in the outer circumferences of the first and second plate portions 12a and 12b of the light-shield plate 12. In addition, pins 50 each having a length slightly larger than the thickness of the light-shield plate 12 are formed integrally on the light-shield plate attaching surfaces 25a, 26a of the first shell 25 and the second shell 26 at positions corresponding to the holes 49 of the light-shield plate 12.

When the light-shield plate 12 is attached to the outside of the cartridge body, the pins 50 of the first shell 25 and the second shell 26 are inserted into the holes 49 so as to protrude from the surface of the light-shield plate 12.

The shutter 13 include a shutter member 55 which is formed by bending a thin plate having light-shielding performance substantially into a U-shape, and a slide member 56 which is shaped like a long and narrow plate and attached to the shutter member 55.

The shutter member 55 includes a first shutter 55a which is inserted between the outer face of the first shell 25 and the first plate portion 12a of the light-shield plate 12, a second shutter 55b which is inserted between the outer face of the second shell 26 and the second plate portion 12b of the light-shield plate 12, and a connecting portion 55c. The connecting portion 55c connects the first shutter 55a to the second shutter 55b, and the slide member 56 is attached to the connecting portion 55c.

Shutter slide faces 25b, 26b offset inward to have a depth not smaller than the thickness of the shutter member 55 are formed on the outer faces of the first shell 25 and the second shell 26 inside the light-shield plate attaching surfaces 25a, 26a'. In this manner, the shutter 13 can move between the cartridge body and the light-shield plate 12 so smoothly that generation of chips etc. due to the movement of the shutter 13 can be suppressed.

The slide member 56 is slidably incorporated between the first shell 25 and the second shell 26 so that the upper face of the slide member 56 may be exposed from the front end face of the cartridge body in the inserting direction. An attaching face 56a to be attached to an inner face of the connecting portion 55c of the shutter member 55 is provided in an end part of an upper face of the slide member 56. Two pins 56b for example are integrally formed on this attaching face 56a. When the two pins 56b are inserted into two holes 55d formed in the connecting portion 55c and distal ends thereof are melted down by heat, the shutter member 55 and the slide member 56 will be fixed to each other.

An operated portion 56d to be operated for opening the shutter 13 is integrally formed in the other end part of the upper face of the slide member 56. By providing the slide member 56 so as to extend with respect to the shutter member 55 in a direction to close the shutter, the operated portion 56d is exposed to the exterior without being hidden by the third plate portion 12c of the light-shield plate 12. The notch 40 in the third plate portion 12c of the light-shield plate 12 is provided for the purpose of avoiding interference with the operated portion 56b, when the shutter 13 has moved to an open position.

The shutter 13 is urged in the closing direction by a shutter spring 59. The shutter spring 59 is formed of a torsion coil spring, for example. Opposite ends of the shutter spring 59 are locked to the slide member 56 and the inner face of the first shell 25.

A lockable groove 56e in a shape of a rectangular hole is formed adjacent to the operated portion 56d in the slide member 56.

Further according to the invention, by providing another RFID additionally inside the cartridge body, it is possible to easily obtain the information of the cartridge itself, and to discriminate the cartridge from other cartridges, which serves as a security measure.

For this purpose, as shown in FIGS. 6 and 7, the cartridge 2 for the photosensitive recording medium is provided with an RFID 81 inside the cartridge body. The RFID 81 is attached to a support rib 82 which is projected from the inner face of the second shell 26. By storing data in this RFID, and making the RFID communicated with the reading device by radio waves as described above, the RFID can be utilized almost permanently without a cell by non-contact power transmission from the antenna side. In this manner, reading and writing become possible even in a shielded dark room inside the drive. Accordingly, the software recorded in the RFID can be discriminated from an imitation which has been falsely copied, and it is possible to discriminate a true product from a copied product by recording a specific code. Because the RFID is incorporated in the cartridge body, an additional work will not be imposed on the operator when the cartridge is handled, but it is possible to write and read the discriminating information by handling the cartridge in the same manner as before, thus enabling the cartridge to be conveniently used.

Moreover, it would be more convenient to write the following information including the above described information, as the information to be written in the RFID.

(1) To write address information in the RFID.

Because the position for the next recording can be detected according to this address information, it is possible to perform rapid inspection. Specifically, because the holographic recording medium is a write-once recording medium, it has been impossible to record updated disk information at the same position at every updating, but the disk information to be updated must be appended to a place next to the place where the previous disk information has been recorded, in the conventional method wherein the disk information (the address information of the recording place for the next recording) has been written in the holographic recording medium. Therefore, in order to know the address number of the place for the next recording, the operator must start from the first writing place of the disk information, trace the recording Areas successively, and proceed to the final writing place to finally learn that there is no further record, whereby the address number of the place where the recording is now on (as the results, the place for the next recording will be learned) can be detected. In this manner, it has taken a considerably long time to obtain the newest disk information. In view of the circumstances, the above described drawback can be overcome, because it is possible to write the newest disk information always in the same place of the RFID.

(2) To record contents which are recorded in the RFID, in the recording medium too.

The RFID is easily handled on one hand, but likely to be broken on the other hand. Therefore, it would be preferable that the contents recorded in the RFID are recorded in the recording medium too, and fixed if possible, so as not to be altered, to perpetuate the recording medium as a back-up.

(3) To make the address information of the RFID in the above item (1) consistent with the record in the recording medium.

Timing when the address information is written in the RFID is not always consistent with the timing when recording is made in the relevant address of the recording medium (It is of course desirable to keep consistency, but it is actually difficult), and either of the timing precedes the other timing. In this case, when an accident such as interruption of electric service has happened to stop the recording process, the address information in the RFID and the record in the recording medium become inconsistent. For the purpose of avoiding such phenomenon, the RFID may be provided with a starting address storing place in which the address of the starting position of the record in the recording medium is written, and a finishing address storing place in which the address of the finished record is written. When the addresses of both the storing places are consistent, it will be found that the address information of the RFID in the above item (1) and the record in the recording medium are consistent. In case where they are inconsistent, it is considered that an accident has happened, and both of them will be written again.

(4) To record an ID number of the RFID tag and an ID number of the cartridge (may be the recording medium) in the RFID. By inspecting security by linking these ID numbers, it is possible to prevent the contents recorded in the recording medium from being altered.

(5) To record an ID number of the hardware (the recording and reproducing apparatus) in the RFID, so that recording can be made when the ID number of the hardware is consistent with all the ID numbers, in addition to the above item (4).

(6) To record information of errors in the RFID. By recording the information in the RFID when errors have occurred during recording, it is possible to trace afterward at which parts of the recording medium a large number of errors have occurred during the recording, which will serve to elucidate causes for the errors.

(7) To record the number of loadings (additional writings) in the RFID.

In the write-once recording medium, additional writings cannot be made so many times. Therefore, the number of loadings had better be recorded for reference of future loading.

(8) To record the number of fixings in the RFID.

After recording has been finished in the holographic recording medium, a light is once irradiated to a recorded part to fix the record. However, the light is not always irradiated to the recorded part only (although it is so intended), but actually, the light of a lamp will leak to spread all over the recording medium. Consequently, the recording will not be conducted when the number of fixings exceeds a certain extent. For this reason, it would be advantageous to learn the number of fixings.

(9) To record specifications of the recording medium in the RFID.

In case where a thickness, recording speed, diameter, forwarding pitch, etc. which are specifications of the recording medium are recorded in the RFID, it would be convenient because desired numerical values can be instantly obtained from the RFID.

(10) To record general information of the RFID in the RFID. In case where ISO standardizing rules of the RFID, and characteristic functions of each manufacturer are recorded in the RFID, it would be convenient because desired information can be obtained from the RFID.

As has been heretofore described, according to the first embodiment of the invention, the RFID is embedded in the region between the clamp area and the recording area of the photosensitive recording medium. Therefore, the information of the photosensitive recording medium itself can be easily obtained, and the photosensitive recording medium can be discriminated from other photosensitive recording mediums. At the same time, the size of the recess is determined so as not to create disk imbalance in rotation of the photosensitive recording medium due to existence of the RFID, and so, the photosensitive recording medium free from the problem of the disk imbalance can be obtained. Moreover, the recording and reproducing apparatus itself which contains the photosensitive recording medium for use is provided with the transmitting and receiving antenna at a position close to the RFID so that the information of the RFID can be easily read, and so, usability will be improved.

As has been heretofore described, according to the second embodiment of the invention, the RFID is embedded in the unrecordable region between the recording area and the outer edge of the photosensitive recording medium. Therefore, the information of the photosensitive recording medium itself can be easily obtained, and the photosensitive recording medium can be discriminated from other photosensitive recording mediums. At the same time, the spindle motor will not be an obstacle, at whichever side of the front and back faces of the disk the reading device may be mounted, and freeness in the mounting position will be enhanced.

This application is based on Japanese Patent application JP 2005-276437, filed Sep. 22, 2005, and Japanese Patent application JP 2005-276438, filed Sep. 22, 2005, the entire contents of which are hereby incorporated by reference, the same as if set forth at length.

What is claimed is:

1. A photosensitive recording medium comprising a substrate in a shape of disc having a center hole in a center part, and a holographic recording layer made from a photosensitive material, said photosensitive recording medium including a clamp area provided near an edge of said center hole and extending over 360 degree so as to surround said center hole, and a recording area provided at a distance from said clamp area and extending over 360 degree so as to surround said clamp area,
wherein an RFID is embedded in a region between said clamp area and said recording area;
wherein a recess is provided in said region, and said RFID is embedded in said recess; and
wherein at least a part of a space around said embedded RFID in said recess is sealed with resin.

2. The photosensitive recording medium as claimed in claim 1, wherein said resin has a smaller specific gravity than the material of said photosensitive recording medium.

3. The photosensitive recording medium as claimed in claim 2, wherein a weight of a portion of said photosensitive recording medium removed for forming said recess is substantially equal to a sum of a weight of said RFID and a weight of said resin which seals said recess.

4. The photosensitive recording medium as claimed in claim 2, wherein a weight for adjusting disk imbalance is provided at an opposite side to said recess with respect to said center hole.

5. A cartridge for a photosensitive recording medium capable of rotatably accommodating a disc-shaped recording medium and comprising a cartridge body having an opening for exposing a center and a recording face of said disc-shaped recording medium, and a shutter assembled to an outside of said
cartridge body and adapted to move between a closed position in which said opening is closed and an open position in which said opening is opened, wherein the photosensitive recording medium as claimed in claim 1 is accommodated in said cartridge.

6. The cartridge as claimed in claim 5, wherein another RI=is provided inside said cartridge body.

7. A recording and reproducing apparatus for a photosensitive recording medium which contains said cartridge as claimed in claim 5 and conducts recording and reproducing on said recording layer of said recording medium while rotating said recording medium by opening said shutter, wherein a reading device for said RFID is provided on an opposite side to a side where a spindle motor for rotating said recording medium is provided.

8. A photosensitive recording medium comprising a substrate in a shape of disc having a center hole in a center part, and a holographic
recording layer made from a photosensitive material, said photosensitive recording medium including a clamp area provided near an edge of said center hole and extending over 360 degree so as to surround said center hole, arida recording area provided at a distance from said clamp area and extending over 360 degree so as to surround said clamp area,
wherein an RFID is embedded in an unrecordable region between said recording area and an outer circumferential edge of said recording medium;
wherein a recess is provided in said region, and said RFID is embedded in said recess; and
wherein at least a part of a space around said embedded RFID) in said recess is sealed with resin.

9. The photosensitive recording medium as claimed in claim 8, wherein said resin has a smaller specific gravity than the material of said photosensitive recording medium.

10. The photosensitive recording medium as claimed in claim 9, wherein a weight of a portion of said photosensitive recording medium removed for forming said recess is substantially equal to a sum of a weight of said RFID and a weight of said resin which seals said recess.

11. The photosensitive recording medium as claimed in claim 9, wherein a weight for adjusting disk imbalance is provided at an opposite side to said recess with respect to said center hole.

12. A cartridge for a photosensitive
recording medium capable of rotatably accommodating a disc-shaped recording medium and comprising a cartridge body having an opening
for exposing a center and a recording face of said
disc-shaped recording medium, and a shutter assembled to an outside of said cartridge body and adapted to move between a closed position in which said opening is closed and an open position in which said opening is opened, wherein the
photosensitive recording medium as claimed in claim 8 is accommodated in said cartridge.

13. The cartridge as claimed in claim 12, wherein another RFID is provided inside said cartridge body.

14. A recording and reproducing apparatus for a photosensitive recording medium which contains said cartridge for the photosensitive recording medium as claimed in claim 12 and conducts recording and reproducing on said recording layer of said recording medium while rotating said recording medium by opening said shutter, wherein a reading device for said RFID is provided close to said RFID.

* * * * *